United States Patent [19]
Grann et al.

[11] Patent Number: 6,035,089
[45] Date of Patent: Mar. 7, 2000

[54] INTEGRATED NARROWBAND OPTICAL FILTER BASED ON EMBEDDED SUBWAVELENGTH RESONANT GRATING STRUCTURES

[75] Inventors: Eric B. Grann, Knoxville, Tenn.; David N. Sitter, Jr., Tuscon, Ariz.

[73] Assignee: Lockheed Martin Energy Research Corporation, Oakridge, Tenn.

[21] Appl. No.: 08/872,884

[22] Filed: Jun. 11, 1997

[51] Int. Cl.$^7$ .................................................... G02B 6/10
[52] U.S. Cl. ............................ 385/129; 385/10; 385/37; 385/132; 385/130; 372/20; 372/99; 372/102
[58] Field of Search .................................. 385/129–132, 385/37, 8, 9, 10, 2, 3, 122; 372/20, 102, 99

[56] References Cited

U.S. PATENT DOCUMENTS

| | | | |
|---|---|---|---|
| 4,502,756 | 3/1985 | Peterson et al. | 350/162.2 |
| 5,216,680 | 6/1993 | Magnusson et al. | 372/20 |
| 5,703,978 | 12/1997 | Digiovanni et al. | 385/37 |
| 5,732,170 | 3/1998 | Okude et al. | 385/37 X |
| 5,732,177 | 3/1998 | Deacon et al. | 385/37 |
| 5,734,772 | 3/1998 | Gopalan et al. | 385/122 |
| 5,745,617 | 4/1998 | Starodubov et al. | 385/37 |

FOREIGN PATENT DOCUMENTS

WO93/01510  1/1993  WIPO.

OTHER PUBLICATIONS

S.S. Wang, et al.: "Multilayer Waveguide–Grating Filters" Applied Optics., vol. 34, No. 4, May 10, 1995, pp. 2414–2420, XPOOO511437, New York, US.

Kipfer, et al.: "Subwavelength Structures and Their Use in Diffractive Optics", Optical Engineering, vol. 35, No. 3, Mar. 1, 1996, pp. 726–731, XPOOO597461.

S. S. Wang., et al.: "Theory and Applications of Guided–mode Resonance Filters", Applied Optics, vol. 32, No. 14, May 10, 1993, pp. 2606–2613, XP000367256.

L. Mashev et al., "Zero Order Anomaly . . . ," Optics Communications, vol. 35, No. 6, Oct. 15, 1985, pp. 377–380.

S. S. Wang et al., "Guided–mode resonances in planar dielectric–layer diffraction gratings," J. Opt. Sco. Am. A/vol. 7, No. 8/Aug. 1990, pp. 1470–1474.

E. Popov et al., "Theoretical study of the anomalies of coated dielectric gratings," Optica Acta, 1986, vol. 33, No. 5, pp. 607–619.

*Primary Examiner*—Phan T. H. Palmer
*Attorney, Agent, or Firm*—Wilson, Sonsini, Goodrich & Rosati

[57] ABSTRACT

A resonant grating structure in a waveguide and methods of tuning the performance of the grating structure are described. An apparatus includes a waveguide; and a sub-wavelength resonant grating structure embedded in the waveguide. The systems and methods provide advantages including narrowband filtering capabilities, minimal sideband reflections, spatial control, high packing density, and tunability.

20 Claims, 5 Drawing Sheets

INTEGRATED NARROWBAND OPTICAL FILTER BASED ON EMBEDDED SUBWAVELENGTH RESONANT GRATING STRUCTURES

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract to Lockheed Martin Energy Research Corporation. The United States has certain rights in this invention.

BACKGROUND OF THE INVENTION

1. Field of the Invention

The present invention relates generally to the field of grating structures. More particularly, the present invention relates to subwavelength grating structures. Specifically, a preferred implementation of the present invention relates to subwavelength resonant grating structures that are embedded in a waveguide. The present invention thus relates to embedded optical gratings of the type that can be termed embedded.

2. Discussion of the Related Art

Historically, subwavelength resonant grating structures have only been large planar surfaces.[1-3] Current integrated narrowband optical filters are limited by their size in the density of devices that can be produced, their overall performance, and their ability to be actively altered for tuning and modulation purposes.

Within this application several publications are referenced by superscripts composed of arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

The below-referenced U.S. Patent discloses embodiments that were satisfactory for the purposes for which they were intended. The entire contents of U.S. Pat. No. 5,216,680 are hereby expressly incorporated by reference into the present application.

SUMMARY OF THE INVENTION

Therefore, there is a particular need for embedding a subwavelength resonant grating structure within a planar waveguide. The invention can be embodied as an integrated narrowband optical filter. Such integrated optical filters can have extremely narrow bandwidths, for example, on the order of a few angstroms. Also, their inherent compact size enables multiple filters to be integrated in a single high density device for signal routing or wavelength discrimination applications. Such filters also have minimal sideband reflections and provide a capability for spatial control and tunability. The invention will have a significant impact in the area of optoelectronics for high throughput communication systems, optical computing, and compact optical sensors.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

A grating structure according to the present invention is confined within a waveguide. As an integrated optical device, the invention can be simple and compact. The invention can also be utilized to implement data processing methods that transform the signals being propagated in the waveguide so as to actuate interconnected discrete hardware elements, such as, for example, switching interconnected routers.

2. Detailed Description of Preferred Embodiments

Figure 1:
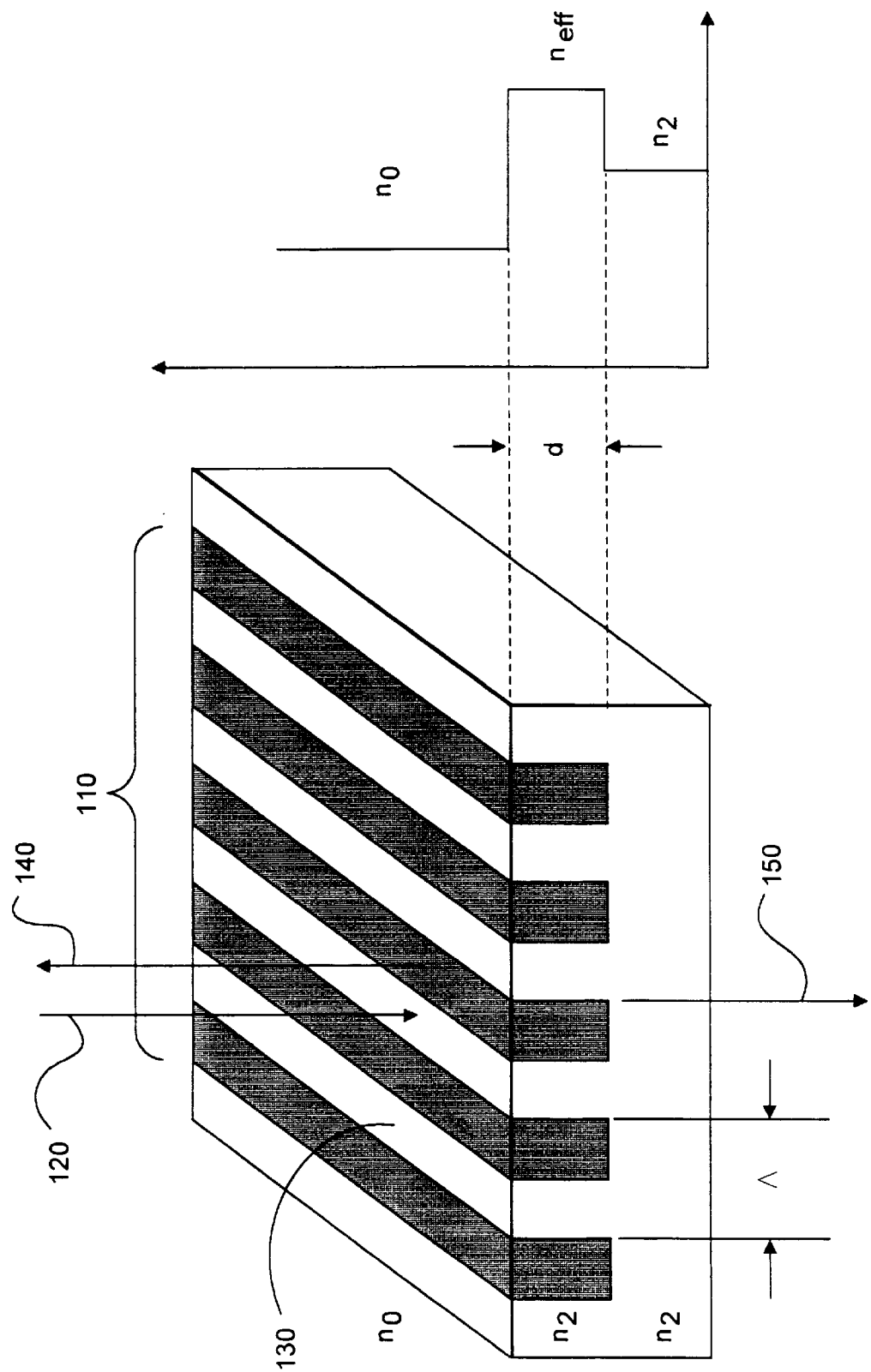
FIG. 1 illustrates a perspective view of a planar surface subwavelength resonance filter, representing an embodiment of the present invention.

Referring to FIG. 1, a subwavelength grating structure 110 is shown. A subwavelength grating structure is a zeroth order diffraction grating that can be represented by an effective uniform homogeneous material ($n_{eff}$). Under particular incident configurations (e.g., a substantially normal incident beam 120) and structural configurations ($n_0 < n_{eff} > n_2$) a subwavelength structured surface 130 exhibits a resonance anomaly which results in a strong reflected beam 140 in an extremely narrow bandwidth. The energy in beam 120 that is not reflected, or absorbed, is transmitted in the form of a transmitted beam 150.

This resonance phenomenon occurs when a surface propagating field is trapped within a grating region due to total internal reflection. If this trapped field is coupled into the mode of the effective waveguide, the field will resonant and redirect all of the energy backwards. This resonance effect results in a total reflection of the incident field from the surface, which is extremely sensitive to wavelength (narrowband reflection filter).

For TE polarization, the coupled-wave equation describing the electromagnetic wave propagation through a planar unslanted waveguide grating is:

$$\frac{d^2 \hat{S}_i(z)}{dz^2} + k^2 \left[ \varepsilon_{avg} - \left( \sqrt{\varepsilon_{avg}} \sin\theta - i\frac{\lambda_0}{\Lambda} \right)^2 \right] \hat{S}_i(z) + k^2 \frac{\Delta\varepsilon}{2} \left[ \hat{S}_{i-1}(z) + \hat{S}_{i+1}(z) \right] = 0 \quad (1)$$

where $\hat{S}_i$ is the amplitude of the ith space harmonic, $k=2\pi/\lambda_0$, $\lambda_0$ is the wavelength in free-space, $\varepsilon_{avg}$ is the average relative permittivity, $\Delta\varepsilon$ is the modulation amplitude, and $\theta$ is the angle of incidence in the grating. As the modulation amplitude $\Delta\varepsilon$ of equation 1 approaches zero it can be compared to the wave equation for an unmodulated dielectric waveguide.

$$\frac{d^2 E(z)}{dz^2} + [k^2 \varepsilon_{avg} - \beta^2] E(z) = 0 \quad (2)$$

where $\beta$ is the propagation constant in the waveguide. Comparing equation 2 to equation 1 results in the effective propagation constant of the waveguide grating $$\beta \rightarrow \beta_i = k \left[ \sqrt{\varepsilon_{avg}} \sin\theta - i\lambda_0/\Lambda \right] \equiv kN_i \quad (3)$$

where $N_i$ is the effective refractive index of the waveguide grating. In order for a guided wave to be excited in the effective waveguide $$\varepsilon_1, \varepsilon_2 \leq N_i^2 \leq \varepsilon_{avg} \quad (4)$$

where $\varepsilon_1$ and $\varepsilon_2$ are the permittivities of the modulated grating region.

For instance, the parameters of the subwavelength grating structure 110 can be set to $n_0=1.0$, $n_1=1.52$, $n_2=1.62$, $d=355$ nm, and $\Lambda=350$ nm, where d is the thickness of the resonant region and $\Lambda$ is the period of the grating. It can be appreciated that in this instance, the beams 120 and 140 are propagating through vacuum.

Figure 2:
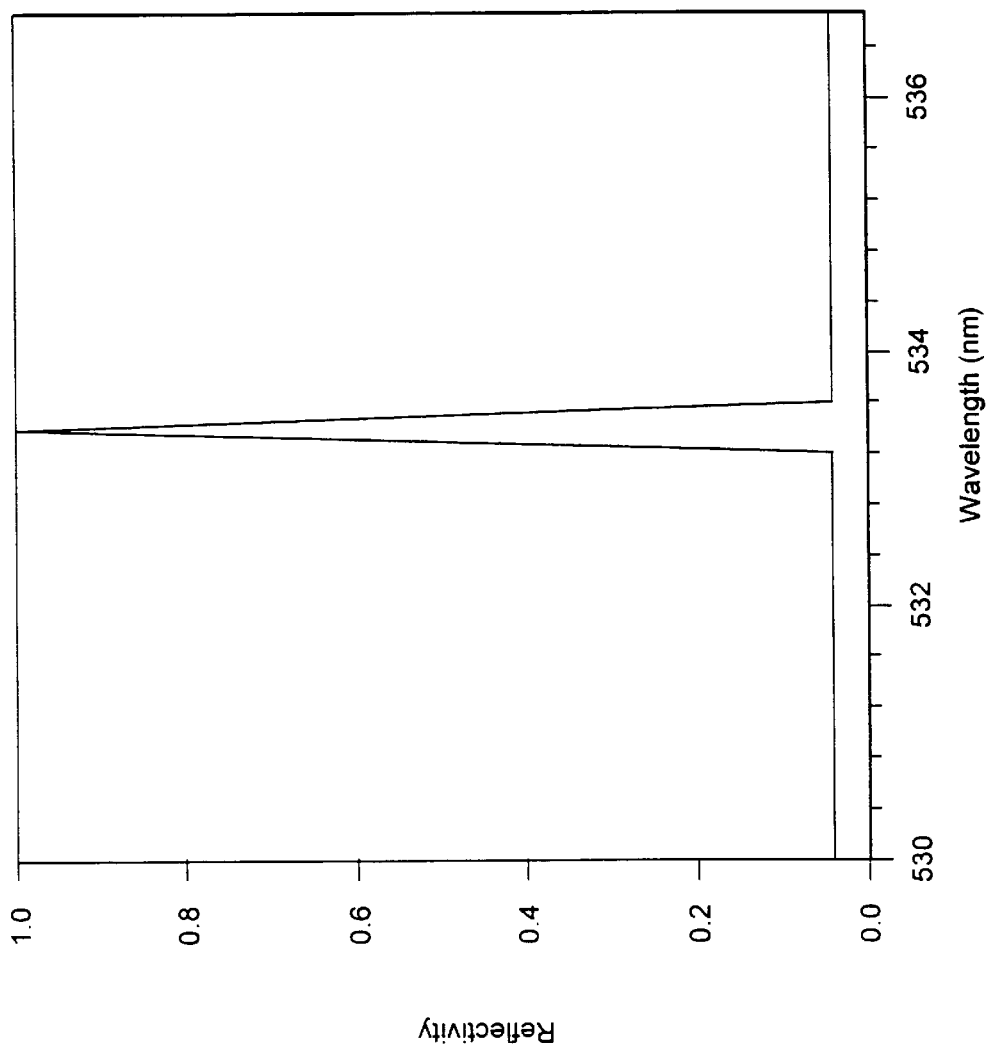
FIG. 2 illustrates a spectral response of a resonant filter, representing an embodiment of the present invention.

Referring to FIG. 2, the response of such a subwavelength grating structure is significant. The resonance wavelength depicted in FIG. 2 is approximately 533.4 nanometers (nm). Significantly, the level of reflectance is substantially unity. It can be appreciated that the bandwidth of the filter is on the order of a few angstroms. In this instance, the structure can be termed a resonant filter.

Figure 3:
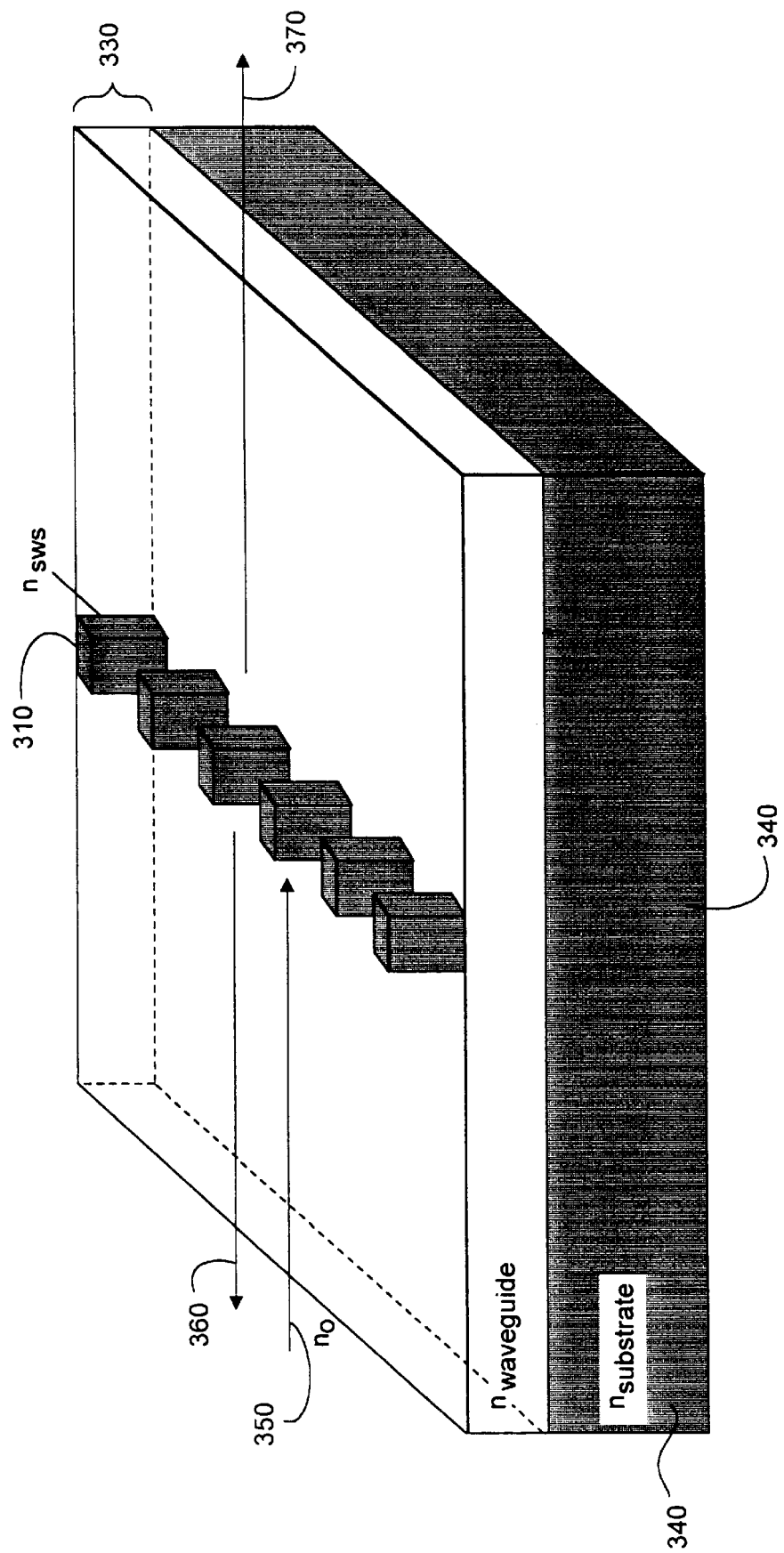
FIG. 3 illustrates a perspective view of an subwavelength resonant structure embedded within a planar waveguide, representing an embodiment of the present invention.

Referring now to FIG. 3, the key element of this invention is that a resonant structure 310 is embedded within a planar waveguide 320 to create an integrated narrowband optical filter 330. The filter 330 can be adjacent a substrate 340.

In order to create a resonance effect, $n_{sws} > n_{waveguide}$, where $n_{sws}$ is the refractive index of the subwavelength structured elements and $n_{waveguide}$, is the refractive index of the waveguide region. Also, in order to propagate the field within the planar waveguide region, $n_0 < n_{waveguide} > n_{substate}$. Each filter strip can be approximately ½ wavelength thick.

An incident beam 350 propagates within the waveguide 320. If the conditions for resonance are met, the incident beam 350 is strongly reflected in the form of a reflected beam 360. If the conditions for resonance are not met, most of the energy contained in the incident beam 350 continues to propagate through the waveguide 320 in the form of a transmitted beam 370.

The resulting ultra-narrowband filters (potentially 1–2 Å bandwidth) can be integrated in high density arrays to provide discrete wavelength discrimination. Manipulating any of the resonant structure's parameters can tune the output response of the filter, which can be used for modulation or switching applications. The center wavelength of the narrowband filter can also be electronically timed over a small range for modulation and switching applications.

The particular manufacturing process used for fabricating the embedded grating structures should be inexpensive and reproducible. Conveniently, the embedded grating structures of the present invention can be carried out by using any standard integrated optics manufacturing method. However, an advantageous technique for fabricating this type of integrated optical filter is to first start with a planar waveguide structure constructed with the appropriate core, cladding, and substrate material. Then to E-beam write the desired structures into a photoresist layer deposited on the top of the waveguide. Once the photoresist is developed, reactive ion etching can be used to replicate the structures within the waveguiding region. The final two steps involve filling in the-holes that have been etched away in the waveguiding region with the appropriate material to create the subwavelength resonant structure, and then polishing the surface flat to eliminate any surface irregularities caused during the deposition process.

Figure 4:
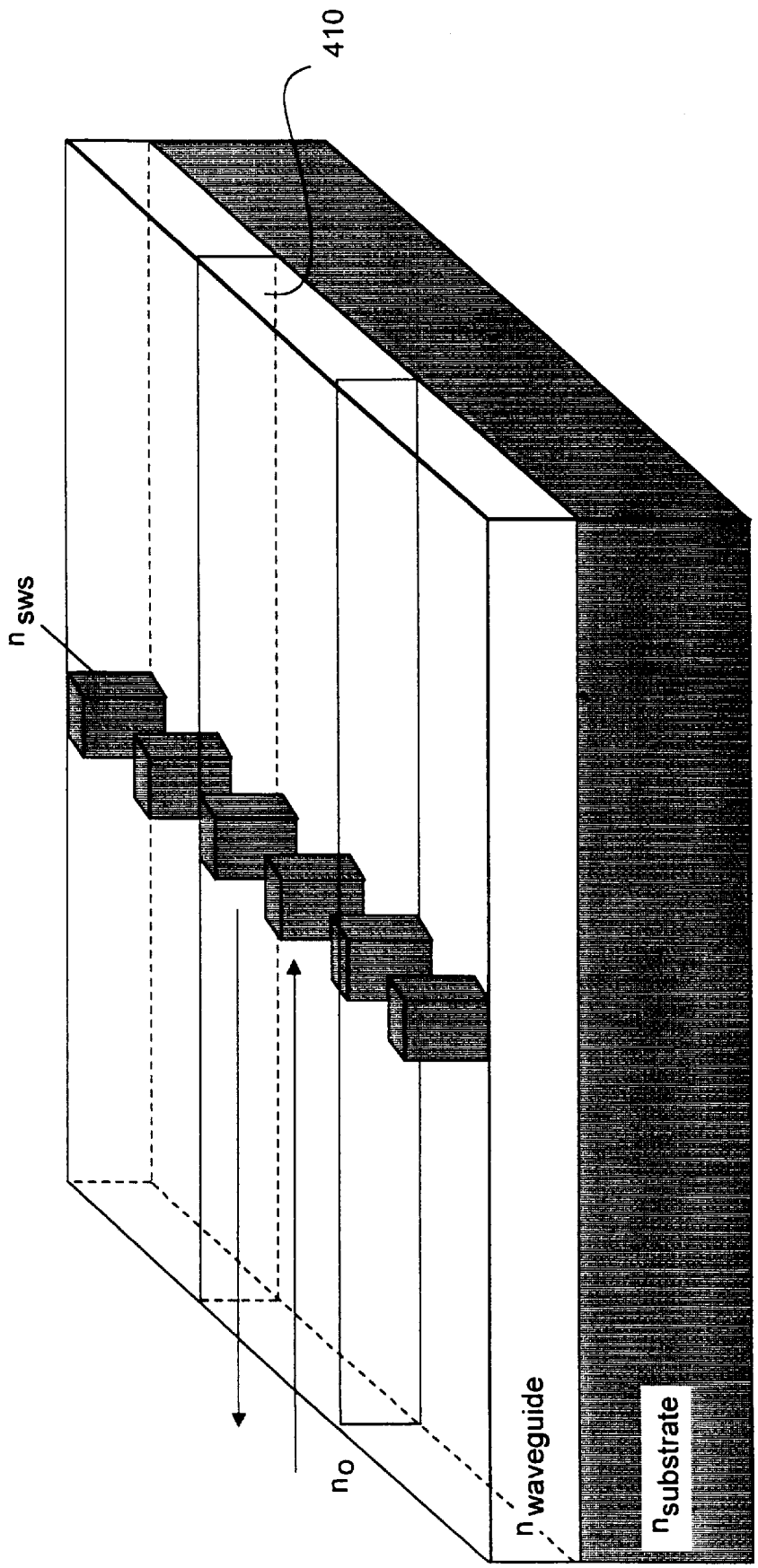
FIG. 4 illustrates a perspective view of an embedded resonance structure within a channel waveguiding region, representing an embodiment of the present invention.
Figure 5:
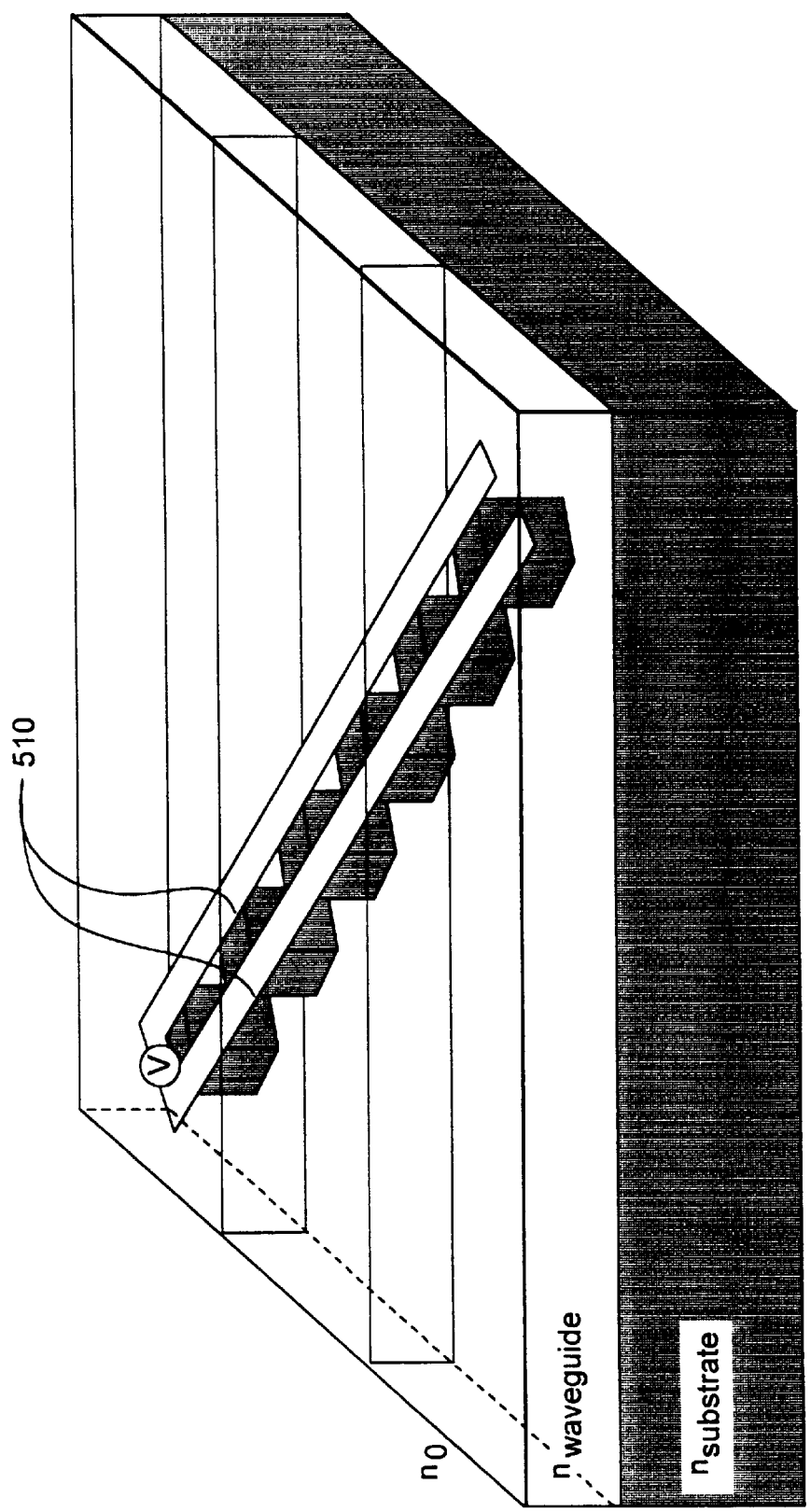
FIG. 5 illustrates a perspective view of an exemplary architecture for electrooptic creation of a resonance structure, representing an embodiment of the present invention.

There are a number of possible architectures for producing an embedded resonant structure within a planar waveguide. A first architecture includes embedding a resonant structure within the waveguiding region. A second architecture includes placing a strip-loaded grating structure above the waveguiding region to create an effective resonance region within the waveguide, as illustrated in FIG. 3. A third architecture includes placing a grating structure within a channel waveguide. In this case, the grating region may extend beyond a waveguiding region in order to create the appropriate resonance as illustrated in FIG. 4. In FIG. 4, the waveguiding region 410 functions as part of the channel waveguide. A fourth architecture includes inducing the resonance structure within the waveguiding region with various modulation techniques (such as the electro-optic effect), as illustrated in FIG. 5. In FIG. 5, a pair of electrodes 510 can apply an electric field across elements of the resonance structure.

However, the particular manufacturing process used for fabricating the grating is not essential to the present invention as long as it provides the described transformation. Normally the makers of the invention will select the manufacturing process based upon tooling and energy requirements, in view of the expected application requirements of the final product and the demands of the overall manufacturing process.

The particular material used for the embedded grating structure should be readily available. Conveniently, the embedded grating structure of the present invention can be made of any amorphous material. It is preferred that the material be very clean. For the manufacturing operation, it is moreover an advantage to employ a chemically vapor deposited material.

However, the particular material selected for fabricating the embedded grating structure is not essential to the present invention, so long as it provides the described function. Normally, the makers of the invention will select the best commercially available material based upon the economics of cost and availability, in view of the expected application requirements of the final product and the demands of the overall manufacturing process.

Practical Applications of the Invention

A practical application of the present invention which has value within the technological arts is wavelength division multiplexing/demultiplexing (WDM). Further, the present invention is useful as a tunable narrowband filter, or for optical signal routing, or as an integrated optical modulator, or as an integrated optical switch, or for spectroscopy, or with biological and chemical integrated optical sensors, or for optical computing. There are virtually innumerable uses for the present invention, all of which need not be detailed here.

Advantages of the Invention

An embedded grating structure, representing an embodiment of the invention is cost effective and advantageous for at least the following reasons. The invention exhibits minimal sideband reflections. Since the resonant structure is buried within a waveguiding region, both the input and output regions of the resonant filter have the same material characteristics. Therefore, by designing the filter thickness to be approximately ½ wavelength thick, and incident field will experience minimal or no Fresnel reflections away from the resonance peak.

The invention provides spatial control. Resonant structures can be placed at a particular angle with respect to the incident field to redirect the resonant energy to another portion of the planar waveguide.

The invention permits a high packing density. The resonant structure is thin (~½ wavelength thick) and thus allows for a high packing density where multiple resonant filters are produced in a single planar waveguide device to perform a number of functions. Each filter can be designed for a particular wavelength, enabling the separation of a multi-wavelength input optical signal. Crossed resonant structures (i.e. two or more resonant structures with cross each other) can also be used with minimal cross-talk between structures.

The invention is capable of tunability. Manipulating any of the parameters of the resonant structure (angle of incidence, refractive indices, grating spacing, grating period, grating thickness) can result in a tuning of the output response.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the subwavelength grating structure described herein is a physically separate module, it will be manifest that the grating structure may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. Wang et al., "Guided-Mode Resonances in Planar Dielectric-Layer Diffraction Gratings," Journal of the Optical Society of America A; Vol. 7, No. 8, Aug. 1990, pages 1470–1474.
2. Popov et al., "Theoretical Study of the Anomalies of Coated Dielectric Gratings," Optica Acta, Vol. 33, No. 5, 1986, pages 607–619.
3. Mashev et al., "Zero Order Anomaly of Dielectric Coated Gratings," Optics Communications, Vol. 55, No. 6, Oct. 15, 1985, pages 377–380.
4. The Electrical Engineering Handbook, CRC Press, (Richard C. Dorf et al. eds., 1993).
5. Handbook of Optics, Volumes I–II, 2nd ed., McGraw Hill Inc., (Michael Bass et al. eds., 1995).

What is claimed is:

1. An apparatus, comprising:
a waveguide; and
a subwavelength resonant grating structure embedded in said waveguide, said subwavelength resonant grating structure i) resonating when a surface propagating field is trapped due to total internal reflection and ii) having substantially no sideband reflections.

2. The apparatus of claim 1, wherein said waveguide is a planar waveguide, and, further comprising a substrate adjacent said planar waveguide.

3. A method for transforming an electromagnetic signal which comprises utilizing the apparatus of claim 1, wherein utilizing includes switching interconnected routers.

4. A method for transforming an electromagnetic signal which comprises utilizing the apparatus of claim 1, wherein utilizing includes optical computing.

5. A method for transforming an electromagnetic signal which comprises utilizing the apparatus of claim 1, wherein utilizing includes wavelength division multiplexing.

6. A method for transforming an electromagnetic signal which comprises utilizing the apparatus of claim 1, wherein utilizing includes wavelength division demultiplexing.

7. An integrated narrowband optical filter, comprising:
a planar waveguide; and
a subwavelength resonant grating structure embedded in said planar waveguide, said subwavelength resonant grating structure i) resonating when a surface propagating field is trapped due to total internal reflection and ii) having substantially no sideband reflections.

8. The integrated narrowband optical fiter of claim 7, further comprising a substrate adjacent said planar waveguide.

9. A method for transforming an electromagnetic signal which comprises utilizing the integrated narrowband optical filter of claim 7 wherein, utilizing includes optical computing.

10. A method for transforming an electromagnetic signal which comprises utilizing the integrated narrowband optical filter of claim 7, wherein utilizing includes switching interconnected routers.

11. A method for transforming an electromagnetic signal which comprises utilizing the integrated narrowband optical filter of claim 7, wherein utilizing includes wavelength division multiplexing.

12. A method for transforming an electromagnetic signal which comprises utilizing the integrated narrowband optical filter of claim 7, wherein utilizing includes wavelength division demultiplexing.

13. A method, comprising:
providing an embedded subwavelength resonant grating structure said subwavelength resonant grating structure i) resonating when a surface propagating field is trapped due to total internal reflection and ii) having substantially no sideband reflections; and
illuminating said embedded subwavelength resonant grating structure with a photon.

14. The method of claim 13, wherein said photon is substantially reflected.

15. The method of claim 13, further comprising tuning said embedded subwavelength resonant grating structure.

16. An apparatus for performing the method of claim 13, wherein said apparatus includes a tunable narrowband filter.

17. An apparatus for performing the method of claim 13, wherein said apparatus includes a chemical integrated optical sensor.

18. An apparatus for performing the method of claim 13, wherein said apparatus includes an integrated optical switch.

19. An apparatus for performing the method of claim 13, wherein said apparatus includes an integrated optical modulator.

20. An apparatus for performing the method of claim 13, wherein said apparatus includes a biological integrated optical sensor.

* * * * *